United States Patent
Abernathy et al.

(10) Patent No.: US 11,256,507 B2
(45) Date of Patent: *Feb. 22, 2022

(54) THREAD TRANSITION MANAGEMENT

(71) Applicant: International Business Machines Corporation, Armonk, NY (US)

(72) Inventors: Christopher M. Abernathy, Austin, TX (US); Mary D. Brown, Austin, TX (US); Susan E. Eisen, Round Rock, TX (US); James A. Kahle, Austin, TX (US); Hung Q. Le, Austin, TX (US); Dung Q. Nguyen, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 30 days.

This patent is subject to a terminal disclaimer.

(21) Appl. No.: 16/397,367

(22) Filed: Apr. 29, 2019

(65) Prior Publication Data
US 2019/0250918 A1    Aug. 15, 2019

Related U.S. Application Data

(60) Continuation of application No. 16/101,431, filed on Aug. 11, 2018, now Pat. No. 10,296,339, which is a division of application No. 15/640,567, filed on Jul. 2, 2017, now Pat. No. 10,055,226, which is a continuation of application No. 14/274,752, filed on
(Continued)

(51) Int. Cl.
G06F 9/30    (2018.01)
G06F 9/38    (2018.01)
G06F 9/46    (2006.01)

(52) U.S. Cl.
CPC ........ G06F 9/30101 (2013.01); G06F 9/3013 (2013.01); G06F 9/30123 (2013.01); G06F 9/384 (2013.01); G06F 9/3851 (2013.01); G06F 9/461 (2013.01)

(58) Field of Classification Search
CPC ....... G06F 9/30145; G06F 9/3851; G06F 9/50
See application file for complete search history.

(56) References Cited

U.S. PATENT DOCUMENTS

| | | |
|---|---|---|
| 5,926,646 A | 7/1999 | Pickett et al. |
| 6,456,891 B1 | 9/2002 | Kranich et al. |

(Continued)

FOREIGN PATENT DOCUMENTS

| | | |
|---|---|---|
| CN | 1975663 | 6/2007 |
| WO | 2006120367 | 11/2006 |

OTHER PUBLICATIONS

Kalla, R., et al., "IBM Power5 Chip: A Dual-Core Multithreaded Processor"; IEEE Micro, Mar.-Apr. 2004, IEEE Oomputer Society (8 pages).
(Continued)

Primary Examiner — Corey S Faherty
(74) Attorney, Agent, or Firm — Jamar K. Ray

(57) ABSTRACT

A system and process for managing thread execution includes providing two data register sets coupled to a processor and using, by the processor, the two register sets as first-level registers for thread execution. A portion of main memory or cache memory is assigned as second-level registers where the second-level registers serve as registers of at least one of the two data register sets for executing the threads. Data for the threads may be moved between the first-level registers and second-level registers for different modes of thread processing.

5 Claims, 6 Drawing Sheets

Related U.S. Application Data

May 11, 2014, now Pat. No. 9,703,561, which is a division of application No. 13/032,737, filed on Feb. 23, 2011, now Pat. No. 8,725,993.

(56) References Cited

U.S. PATENT DOCUMENTS

| | | |
|---|---|---|
| 6,954,846 B2 | 10/2005 | Leibholz et al. |
| 7,284,092 B2 | 10/2007 | Nunamaker et al. |
| 7,290,261 B2 | 10/2007 | Burky et al. |
| 7,458,076 B2 | 11/2008 | Swanberg et al. |
| 7,624,257 B2 | 11/2009 | Kra |
| 2006/0031658 A1 | 2/2006 | Swanberg et al. |
| 2006/0120367 A1 | 6/2006 | Beckmann et al. |
| 2007/0022428 A1 | 1/2007 | Yamasaki |

OTHER PUBLICATIONS

McNairy, C., et al., "Montecito: A Dual-Core, Dual-Thread Itanium Processor", IEEE Micro, Mar.-Apr. 2005, IEEE Computer Society (11 pages).

Vouk, N., "Buddy Threading in Distributed Application on Simultaneous Multi-Threading Processors", Masters Thesis, North Carolina State University, 2005 (96 pages).

Shriraman, A., et al.; "Flexible Decoupled Transactional Memory Support", Technical Report No. 925, University of Rochester, Nov. 2007 (20 pages).

Curtis-Maury, M. F., "Improving the Efficiency of Parallel Applications on Multithreaded and Multicore Systems", Virginia Polytechnic Institute, Mar. 2008 (191 pages).

Patent Cooperation Treaty International Search Report and Written Opinion; International Application No. PCT/IB2012/050761; International dated Feb. 20, 2012.

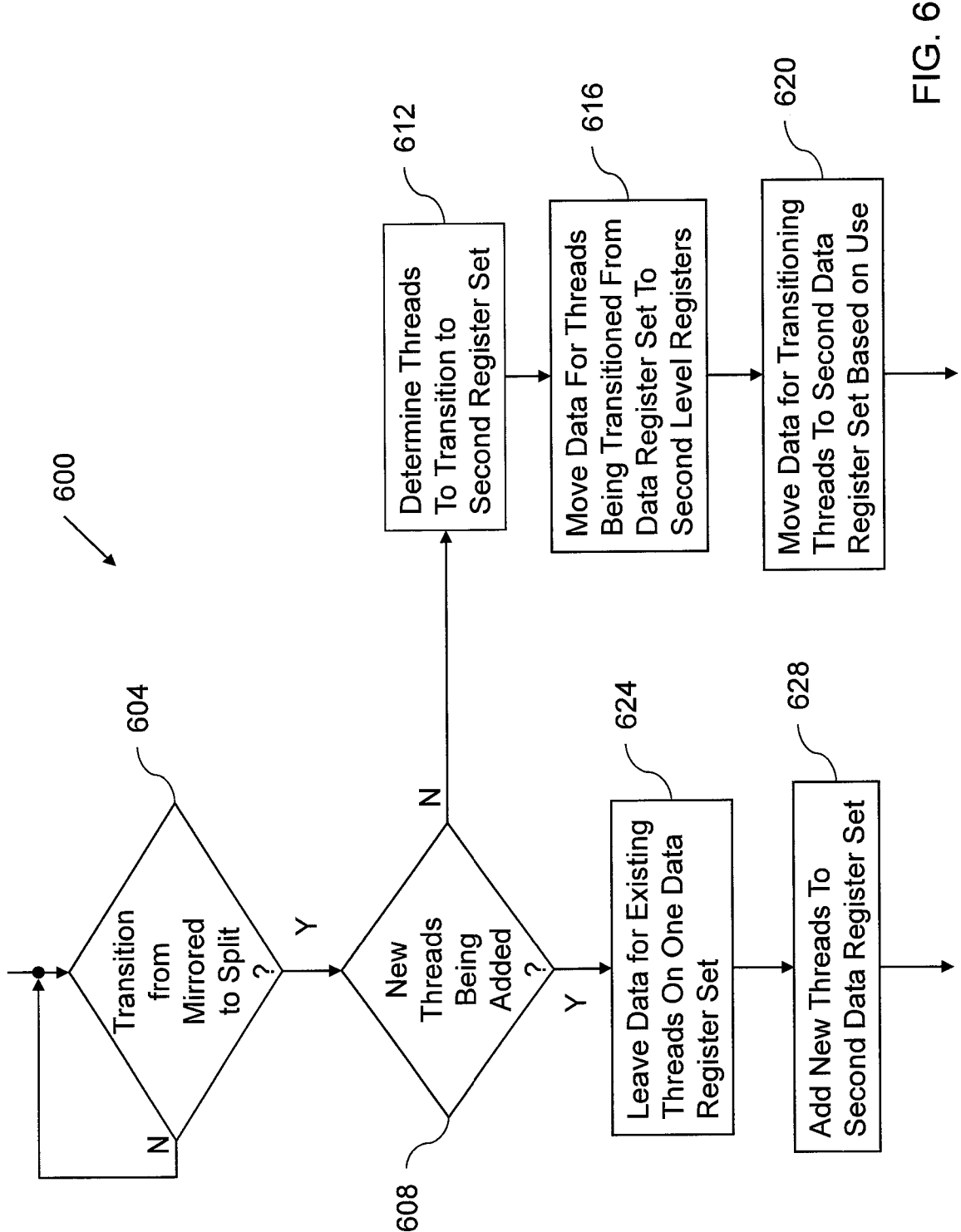

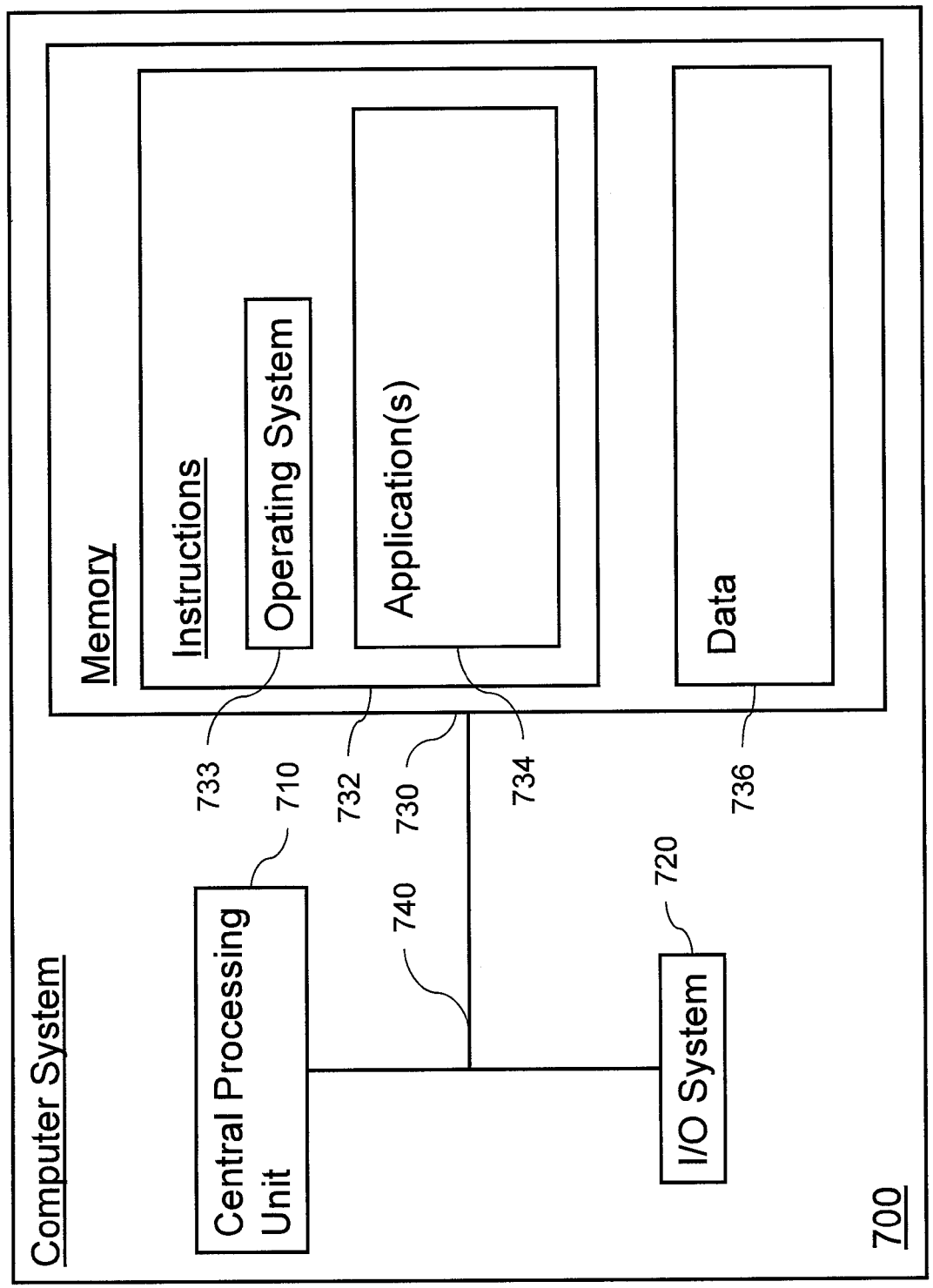

THREAD TRANSITION MANAGEMENT

BACKGROUND

The present invention relates to processors, and more specifically to processor threads.

Advanced processors can typically create a number of threads (e.g., four), which may be subparts of a process. The threads are usually assigned identifiers (e.g., 0, 1, 2, and 3) and executed in a time-division multiplex manner by the processor. Additionally, the threads may share the same memory (e.g., registers) on the processor or have memory assigned to them (e.g., particular registers). When a thread is complete, its data is typically removed from the processor memory by stopping operations, moving the data to be retained out to another memory (e.g., main memory), invalidating the processor memory, and then loading the data to be saved back into the processor memory.

BRIEF SUMMARY

In one implementation, a process for managing thread execution may include providing two data register sets coupled to a processor and using, by the processor, the two register sets as first-level registers for thread execution. A portion of main memory or cache memory is assigned as second-level registers where the second-level registers serve as registers of at least one of the two data register sets for executing the threads. Data for the threads may be moved between the first-level registers and second-level registers for different modes of thread processing.

The details and features of various implementations will be conveyed by the following description, along with the drawings.

BRIEF DESCRIPTION OF THE SEVERAL VIEWS OF THE DRAWINGS

FIG. 6 is a flowchart illustrating another example process for managing thread transitions.

FIG. 7 is a block diagram illustrating an example computer system for which thread transitions may be managed.

DETAILED DESCRIPTION

Figure 1:
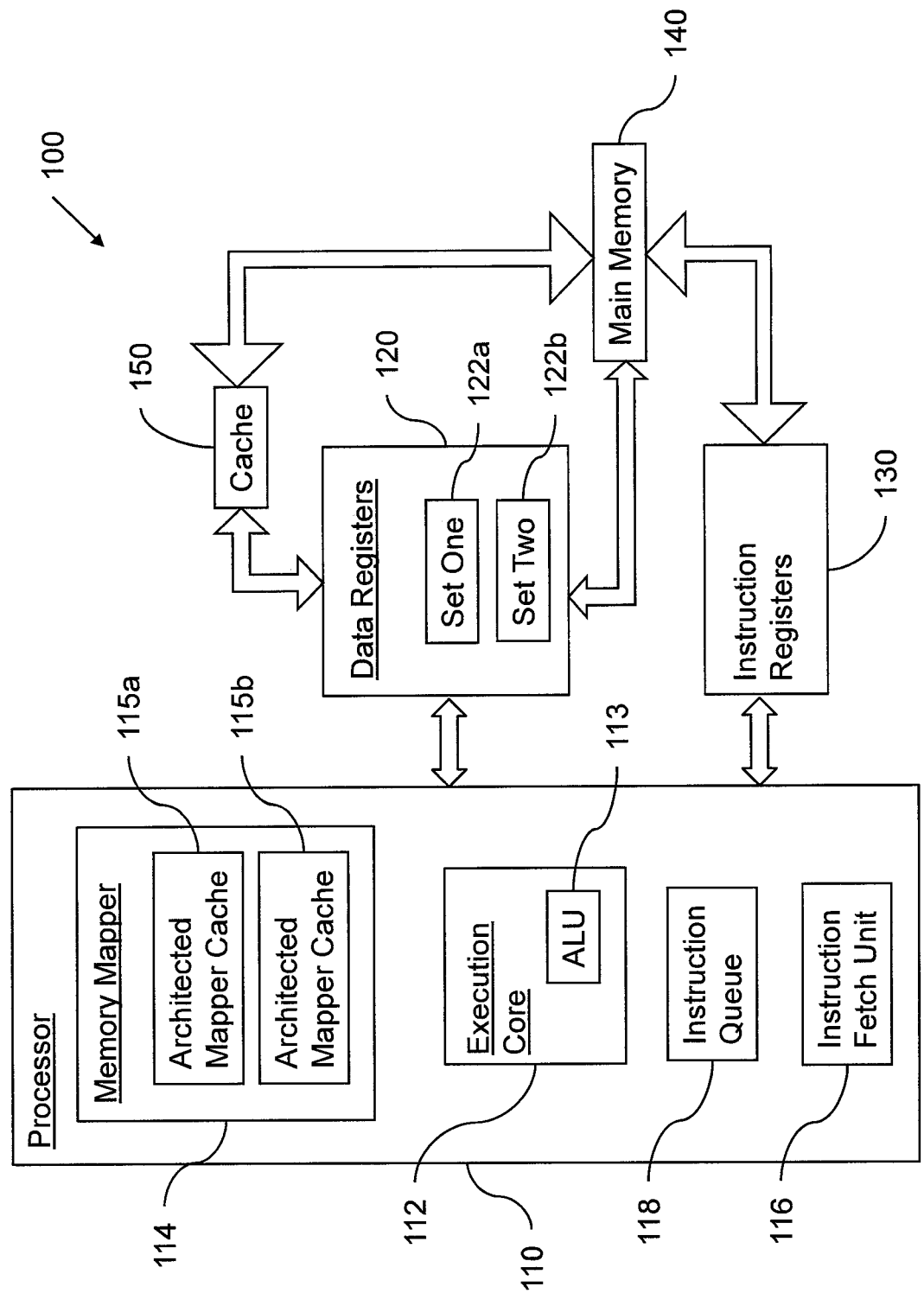
FIG. 1 is a block diagram illustrating an example system for managing thread transitions.

Processor thread transitions may be managed by various techniques. In particular implementations, managing thread transitions may include the ability to move thread data between data register sets and second-level registers. Being able to move thread data between data register sets and second-level registers may provide a variety of benefits, such as allowing threads to start without stopping current operations, allowing data register sets to operate in a mirrored manner for multiple threads, and/or allowing an expanded number of threads to operate.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

FIG. 1 illustrates an example system 100 for managing thread transitions. System 100 includes a processor 110, data registers 120, instruction registers 130, main memory 140, and cache memory 150.

Processor 110 includes an execution core 112, a memory mapper 114, an instruction fetch unit 116, and an instruction queue 118. Execution core 112 is responsible for processing data under the direction of program instructions (e.g., from software) and includes an arithmetic logic unit (ALU) 113 that assists in executing the instructions. Execution core 112 is also capable of simultaneously executing multiple independent hardware threads of execution. Memory mapper 114, which will be discussed in more detail below, is responsible for managing the allocation of register data between data registers 120 and other system memory (e.g., main memory 140 and/or cache memory 150). Instruction fetch unit 116 is responsible for fetching and ordering instructions for execution in multiple concurrent hardware threads. Instruction fetch unit 116 is coupled to instruction queue 118 to which the instruction fetch unit dispatches instructions and from which instructions are issued, possibly out-of-order, to execution core 112 for execution.

Instructions may take instructions may take various forms for different instruction types or in different instruction set architectures. As one example, instructions may take the form:

opcode RT, RA, RB where opcode is the operation code of the instruction, RT, if present, identifies a logical destination (target) register that will receive the execution result (destination operand) of the instruction, and RA and RB, if present, identify the logical source register(s) that provide source operands of the instruction.

Data registers 120 locally store the data on which execution core 112 operates (e.g., source operands). The data stored by the registers may, for example, include fixed-point values, floating-point values, vector values, decimal values, condition code values, count values, and/or any other appropriate type of data. Data registers 120 also store the data that results from operations (e.g., destination operands). The data may also be stored at different locations (e.g., main memory 140 and/or cache 150). The contents of data registers 120 may include both architected register values, which represent the current non-speculative state of threads, as well as non-architected register values, which represent working or "in-flight" values not yet committed to the architected state of the threads. Data registers 120 may be general purpose registers. That is, they may store data or pointers (e.g., addresses) to data.

In the illustrated implementation, data registers 120 are divided into two sets 122. This division may, for example, allow better access to execution core 112. For instance, by using two register sets 122, the number of read ports, which, for example, provide access to load/store units, load units, and/or floating point units, may be increased. The depth of (i.e., number of registers in) each register data set 122 is typically limited to a size determined to provide adequate storage capacity for the number of supported threads while meeting desired access latency and/or power consumption targets.

Instruction registers 130 locally store the instructions that execution core 112 executes. The instructions may also be stored at different locations (e.g., main memory 140 and/or an instruction cache).

Main memory 140 is responsible for storing an enlarged list of the instructions being executed, along with the associated data. Data registers 120 may access the specific data from main memory 140 as needed, and instruction registers 130 may access the specific instructions from main memory 140 as needed. In particular implementations, main memory 140 may include random access memory (RAM).

Cache memory 150 is responsible for storing some of the data in main memory 140. Processor 110 may typically access cache memory 150 faster than main memory 140. Thus, processor 110 may attempt to store the more commonly accessed data in cache memory 150 to speed up operations. Cache memory 150 may be implemented on-chip or off-chip.

Processor 110 may use data register sets 122 in a variety of manners depending on the operations called for by a process. For example, if processor 110 is only executing one thread of a process, which may, in fact, be the process itself, data register sets 122 may contain mirrored data. That is, the contents of data register sets 122 may be the same. Thus, the thread may share the data register entries and access execution core 112 through all available ports for data registers 120.

As another example, if processor 110 is executing two threads of a process, data register sets 122 may contain mirrored data or split data (i.e., one thread's data on each set). For instance, if data register sets 122 each contain 64 registers and each thread requires 32 registers, then each data register set 122 could hold all of the data for each thread, which would allow the data to be mirrored. Thus, each thread may share the data register entries and access execution core 112 through all available ports for data registers 120. However, the data for the two threads could also be split between the data register sets 122 (e.g., the data for the first thread could be on data register set 122a and the data for the second thread could be on data register set 122b). Thus, each data register set 122 could contain data for only one set of threads, and each thread could access only part of execution core 112, through half of the ports available for data registers 120. This mode could be advantageous because it typically leaves more registers in the data register set for "in-flight" usage, which, for some workloads, could be a bottleneck.

Continuing with the example register sizes and thread requirements, once the thread count increases above two, the data register sets 122 may be used in a split mode, because there is insufficient room to hold all of the threads' data on one set. In a four thread situation, for example, the data for the first and third threads could be on data register set 122a and the data for the second and fourth thread could be on data register set 122b. This would allow each thread to access execution core 112 through half of the ports available for data registers 120.

In some situations, however, there may be a need for more threads than data registers 120 can support. For instance, if there are four threads running and each needs 32 registers, then 128 registers are needed in total, which are typically available between set one 122a and set two 122b. However, if eight threads need to run, then 256 registers are needed, which are typically not available.

Memory mapper 114 is responsible for managing the register memory when the memory needed exceeds that available in data registers 120. In situations in which the register memory needed is larger than the available data registers 120, memory mapper 114 may assign portions of non-register memory in system 100 (e.g., main memory 140 and/or cache 150) to serve as registers. Thus, data registers 120 in combination with other memory of system 100 may serve as an enlarged number of registers, thereby creating a first register level (i.e., the data registers 120) and a second register level (i.e., portions of non-register memory). This enlarged number of registers may be operated in similar manners (e.g., mirrored or split) as registers 120, except for the latency occasioned by the second form of memory, which typically takes longer to access.

In more detail, memory mapper 114 may include data structures and logic to track architected and non-architected register values in processor 110 by mapping logical registers referenced by instructions executed in execution core 112 to particular physical registers in data registers 120 or in the second-level registers. Memory mapper 114 may, for example, associate an identifier (e.g., a number) with each thread and have physical pointers to the architected data. Thus, logical locations for a thread may be converted to physical pointers to associate a thread with a register.

For example, memory mapper 220 may include an in-flight mapper including a plurality of entries that track, for all simultaneous threads, the physical registers in data registers 120 allocated as destination registers for in-flight instructions that have not yet committed execution results to the architected state of processor 110. The data register 120 allocated as the destination register of a particular instruction may be indicated by placing a register tag (RTAG) of the physical register in the entry of in-flight mapper assigned to that particular in-flight instruction.

In addition, memory mapper 114 may include a mapping data structure to track the assignment of data registers 120 to architected logical registers referenced by instructions across all simultaneous threads. In the illustrated implementation, this data structure is implemented as architected mapper caches 115, each of which is associated with one of data register sets 122. (In mirrored memory situations, one of architected mapper caches 115 may be used.) Architected mapper caches 115 may, for example, include a plurality of rows that each containing multiple entries. The rows may be indexed by an architected logical register (LREG) or a subset of the bits composing an LREG. Data registers 120 may can contain multiple physical registers for the different threads corresponding to the same LREG or LREG group specified by the row index. Consequently, each row of an architected mapper cache 115 may contain multiple mappings for a given LREG or LREG group across the multiple simultaneous hardware threads.

Each row of architected mapper caches 115 may also have a respective associated replacement order vector indicating a replacement order of its entries in accordance with a selected replacement methodology (e.g., least recently used (LRU)). The replacement order vector may be updated when a row is accessed at instruction dispatch (if the source logical register of the dispatched instruction hits in an architected mapper cache 115), at completion of an instruction having a destination logical register mapped by an architected mapper cache 115, and when a swap request that accesses an architected mapper cache is issued. A swap request may, for instance, be triggered when a dispatched instruction needs to source data that does not reside in data registers 120, as determined by the architected mapper cache. Swap operations are queued, along with the instruction waiting on the swap, and a swap then "issues," swapping data from the second-level registers in system 100 with a victim in data registers 120. The victim is determined by the architected mapper cache using an LRU algorithm. Once the swap is accomplished, the waiting instruction can be notified.

An entry in an architected mapper cache 115 may include a number of fields, including an RTAG field, which identifies a physical register in data registers 120 mapped by that architected entry, as well as a thread ID field identifying the hardware thread currently using the identified physical register. The architected logical register currently mapped to the data register 120 indicated by the RTAG field can be explicitly indicated by an additional field in the entry or can be implicitly indicated by the index into architected mapper cache 115 associated with the entry.

In particular modes of operation, memory mapper 114 may also monitor the accesses of the data registers (actual and simulated) by processor 110 and move data that is accessed more often into data registers 120 and move data that is not accessed into non-register memory that is simulating registers (i.e., second-level registers). For example, memory mapper 114 may include swap control logic that manages the transfer of operands between data registers 120 and second-level registers (e.g., portions of cache 150 and/or main memory 140 that have been designated as registers). In one preferred embodiment, the swap control logic may be implemented utilizing a first-in first-out (FIFO) queue that holds operand transfer requests of memory mapper 114 until they are serviced.

Continuing with the example register sizes and thread requirements, if eight threads are required for a process, the data register sets 122 may be used in a split mode, because there is insufficient room to hold all of the threads' data on one set. But there is also insufficient room to hold all of the threads' data in data registers 120. Thus, memory mapper 114 may assign other memory in system 100 to serve as registers. For instance, memory mapper 114 could assign 16 registers worth of main memory 140 to each thread, resulting in each thread having 16 registers in data registers 120 and 16 second-level registers (in main memory 140).

Memory mapper 114 may even allow the register sets to be mirrored in high thread count situations. For example, if there are more than two threads for the example register and thread allocation, then there are an insufficient number of registers in each of data register sets 122 to allow mirroring of the data register sets. However, by allocating sufficient space in other memory of system 100, the register sets could behave as if they were mirrored. For instance, if there are four threads that require processing, memory mapper 114 could allocate space in main memory 140 equivalent to each of data register sets 122 to serve as registers. Thus, data register set 122a plus its equivalent allocation in main memory 140 could hold all of the data required for the threads, and data register set 122b plus its equivalent allocation in main memory 140 could hold all of the data required for the threads. Memory mapper 114 could then monitor the accesses of the data by the processor and move data that is accessed more often into data registers 120 and move data that is not accessed into the portion of main memory 140 that is simulating registers. One of architected mapper caches 115 may be used to manage the allocation of registers between register data sets 120 and the second-level registers.

The movement of data into data registers 120 from second-level registers may be accomplished in various ways. For example, the movement may be accomplished by using a swap, which was discussed previously. Other threads can be executing while this occurs as normal without quiescing. Additionally, the movement may be accomplished by using castouts, which occur when a target completes and does not have older architected data for that same logical register in data registers 120 (i.e., it is in the second-level registers). The architected memory cache is used to find a victim (using LRU) to move from the first-level registers to the second-level registers to make room for the completing target.

When operating in a split mode, as threads are started, they may be assigned to particular data register sets 122. For example, a first thread may be assigned to data register set 122a, a second thread may be assigned to data register set 122b, a third thread may be assigned to data register set 122a, and a fourth thread may be assigned to data register set 122b. When starting with a given number of threads, the assignment may be predetermined or determined by an algorithm (e.g., one that assigns threads to data register set 122 that has the least number of active threads). Processor 110 may operate using these threads for any appropriate length of time.

Additionally, when a thread stops, its data may be flushed from data registers 120. For example, if the third thread stops, its data may be flushed from data register set 122a. To accomplish this, memory mapper 114 may be accessed with a thread identifier to determine which data register set 122 contains registers for the thread that is stopping and the particular registers for the thread in that set. These registers may then be invalidated by an architected memory cache. For instance, the registers may be invalidated right away, or they can just be marked and "castout" at a later time, via dummy completions. The castout operation in this situation is similar to the one performed for a completion (mentioned above), but here the architected memory cache entry is invalidated, and the entry victimized is kicked out of the first-level register (i.e., data registers 120) to the second-level registers. These operations will allow registers to be freed up for the other threads that are on that particular data register set 122, and the entries will typically be used relatively quickly by other threads' in-flight data. If the data is not flushed, the corresponding entries in the architected mapper cache 115 for the stopped thread will eventually be evicted by other threads.

As additional threads are added, memory mapper 114 may assign registers to the thread without having to stop operations for the already active threads. For instance, memory mapper 114 may assign second-level registers to serve as registers for a thread being added. Then, as the thread becomes more active, the data may be migrated to the data registers 120. The data register set 122 to handle the thread may be assigned based on a balancing algorithm.

At some points of operation, processor 110 may choose to transition data register sets 122 from a split mode to a mirrored mode. For example, if the number of threads is dropping from eight to two, the processor may determine that the mirrored mode is more efficient. In mirrored mode, however, the contents of the data register sets 122 are synchronized. To accomplish this transition, the in-flight instructions on all threads may be flushed, architected mapper caches 115 may be drained, the data registers for the remaining threads may be moved to second-level registers (e.g., via dummy completion operations), and data registers 120 may be invalidated. Draining an architected memory cache may be accomplished by performing castouts via dummy completions. For instance, the entries in the architected memory cache may be invalidated, and their victims may be moved out of data registers 120 into the non-register memory. When finished, therefore, the architected memory caches are empty, meaning that no architected data exists in the data registers 120. Then, when execution resumes in mirrored mode, data may be brought back from the second-level registers to both of data register sets 122. As instructions complete, they will allocate entries for their destination registers into an architected mapper cache 115 and remove victims from other threads as necessary (although initially, no other threads would be in the architected memory cache).

At other points in operation, processor 110 may choose to transition data register sets 122 from a mirrored mode to a split mode. For example, the processor may choose to transition from a two thread-mirrored mode to a two thread-split mode. In these instances, any threads that exist on data register set 122a and that are to be transitioned to data register set 122b are drained from architected mapper cache 115a so they can be reloaded into data register set 122b and its associated architected mapper cache 115b when execution resumes. Also, when going from a mirrored mode (e.g., a two thread-mirrored mode) to a higher split mode (e.g., a four thread-split mode), rather than moving register data for an existing thread to the second-level registers, the thread may be assigned to data register set 122a, while some/all of the newly added threads are assigned to data register set 122b. In situations in which a relatively large imbalance, however, is going to occur (e.g., fours threads on one side and one thread on another) some of the data for the existing threads may be moved to the second-level registers and reloaded on data register set 122b to rebalance the sets. Note that when data is moved from one of data register sets 122 to the second-level registers, the threads on that data register set may have to be quiesced, or stopped, to avoid any potential conflicts on the data usage.

In certain modes of operation an imbalance may be created between data register sets 122. For example, due to threads stopping, data register set 122a may have data for four threads, and data register set 122b may have data for one thread. In this instance, processor 110 may move the data in data registers 120 to the second-level registers and reassign the threads to different data registers sets 122 (e.g., two and two). The data may then be brought back in from the second-level registers.

System 100 has a variety of features. For example, when threads stop, the remaining active threads do not have to be reassigned identifiers, which may involve writing the data in the registers to another memory, invalidating the registers, and loading the data back in the registers. Moreover, a given thread does not have to be on a given register set. As another example, active threads do not have to be quiesced to allow registers to be assigned for threads being added. As an additional example, higher numbers of simultaneous threads may be implemented, and higher numbers of threads may be used in a mirrored mode.

In other implementations, system 100 may include fewer or additional elements. For example, system 100 may not include a cache. As another example, system 100 may include one or more memory controllers, network interface cards, I/O adapters, non-volatile data storages, and/or bus bridges, as well as other known elements.

Figure 2:
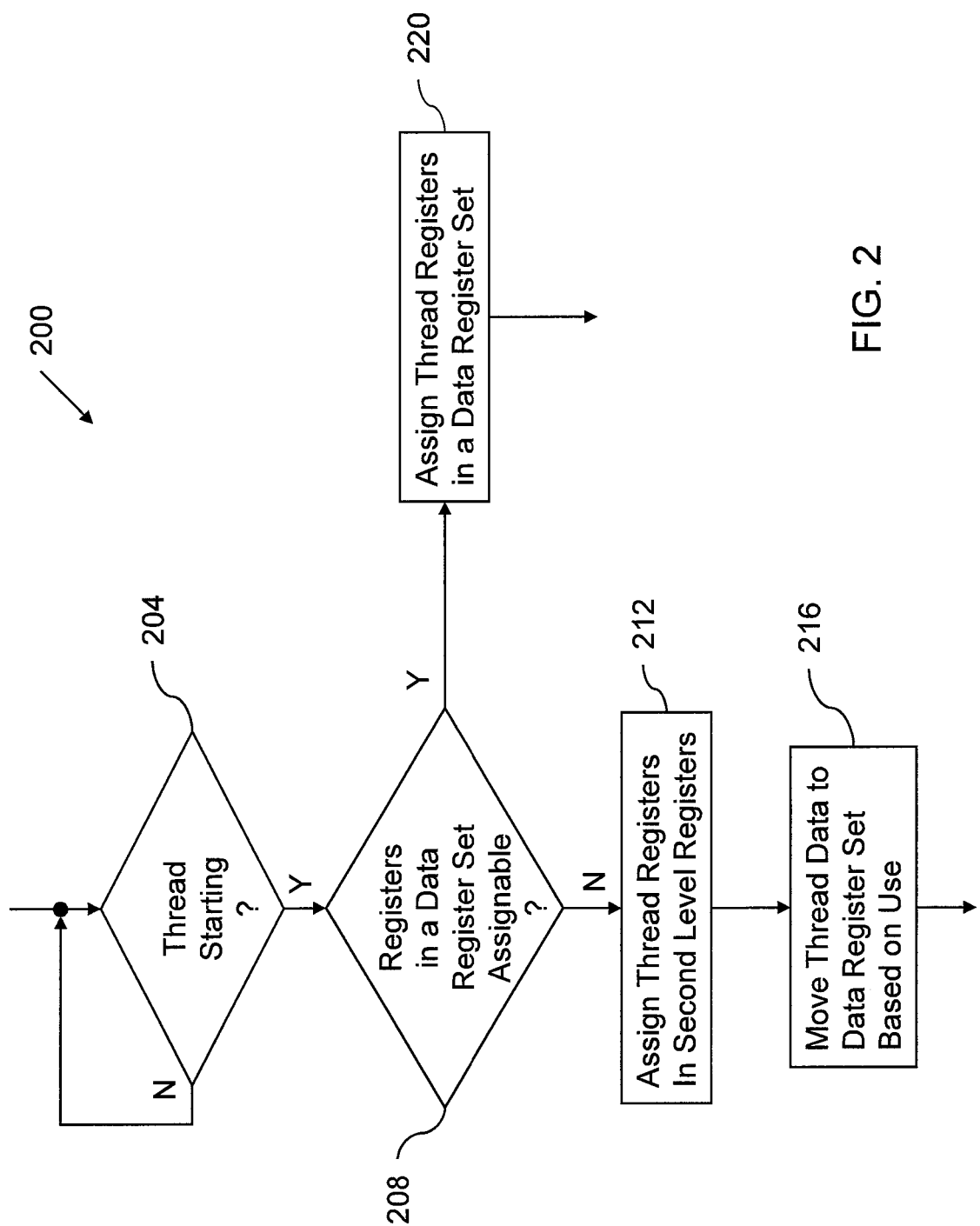
FIG. 2 is a flowchart illustrating an example process for managing thread transitions.

FIG. 2 illustrates an example process 200 for managing thread transitions. Process 200 may, for example, be implemented by a processor such as processor 110.

Process 200 calls for determining whether a thread is starting (operation 204). Determining whether a thread is starting may, for example, be accomplished by determining whether an interrupt has occurred. If a thread is not starting, process 200 continues to wait for a thread to start.

Once a thread is starting, process 200 calls for determining whether registers in a data register set are assignable for the thread (operation 208). Registers in a data register set may, for example, be assignable if the data register set is not currently being used.

If registers in a data register set are not assignable (e.g., because the data register set already has an assigned thread), process 200 calls for assigning registers for the thread in second-level registers (e.g., main memory) (operation 212). The registers may, for example, be assigned by being tagged for the thread in a memory mapper. Data for executing the thread instructions may then be loaded into the second-level registers.

Process 200 also calls for moving data for the thread from the second-level registers to a data register set based on use (operation 216). For example, as data for executing thread instructions is required, the data may be moved from the second-level registers to a data register set.

If registers in a data register set are assignable, however, process 200 calls for assigning registers for the thread in a data register set (operation 220). Data for executing the thread instructions may then be loaded into the registers in the data register set.

Figure 3:
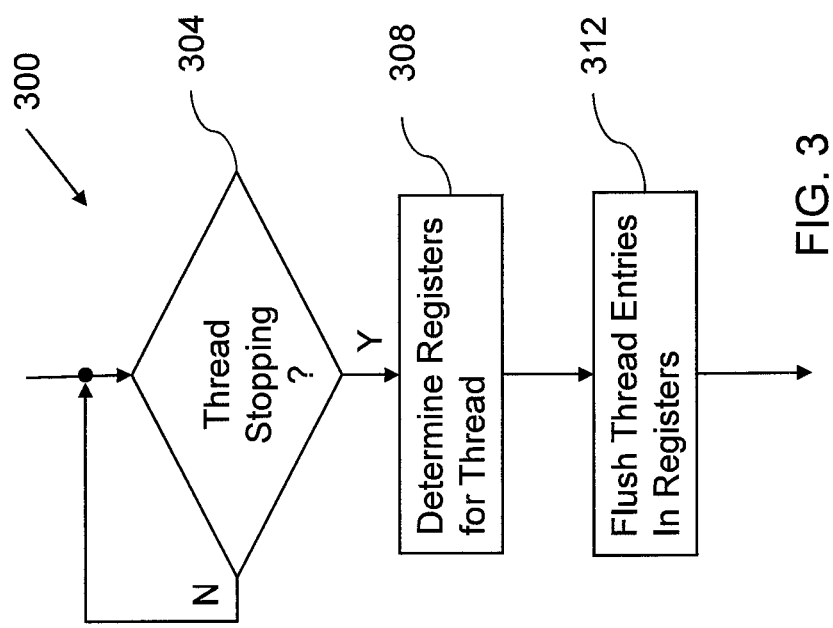
FIG. 3 is a flowchart illustrating another example process for managing thread transitions.

FIG. 3 illustrates another example process 300 for managing thread transitions. Process 300 may, for example, be implemented by a processor such as processor 110.

Process 300 calls for determining whether a thread is stopping (operation 304). If a thread is not stopping, process 300 continues to wait for a thread to stop.

Once a thread is stopping, process 300 calls for determining registers for the stopping thread (operation 308). Determining registers for the stopping thread may, for example, be accomplished by providing a thread identifier to a memory mapper. Process 300 also call for flushing thread entries in the associated registers (operation 312). For instance, these registers may be invalidated immediately or marked for castout at a later time. The remaining threads may continue operation on as before. That is, they do not have to be reidentified and/or reassigned just because a thread is stopping.

Figure 4:
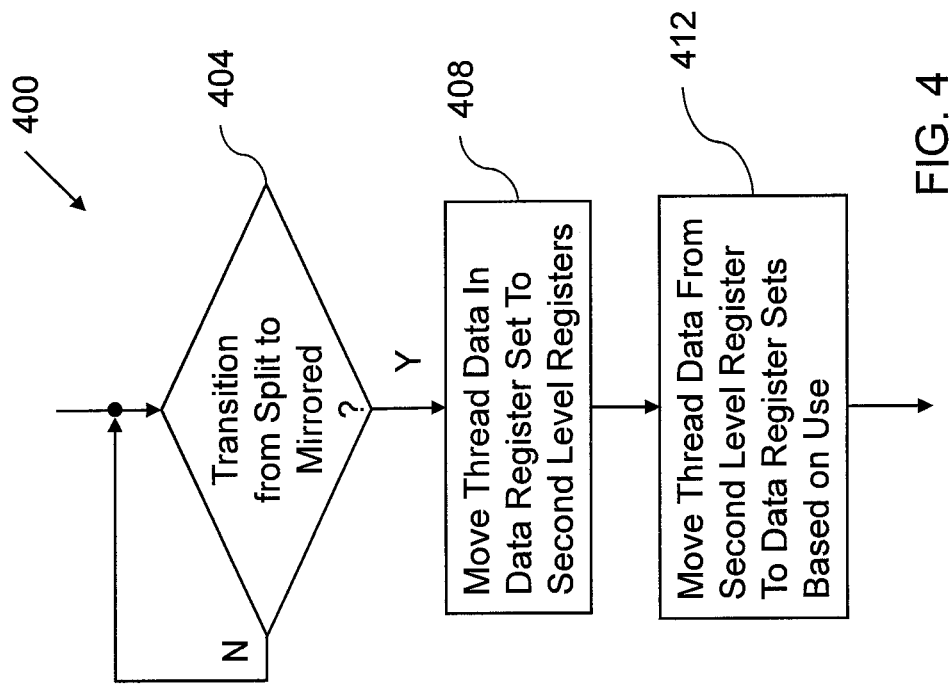
FIG. 4 is a flowchart illustrating an additional example process for managing thread transitions.

FIG. 4 illustrates an additional example process 400 for managing thread transitions. Process 400 may, for example, be implemented by a processor such as processor 110.

Process 400 calls for determining whether a transition from a split mode to a mirrored mode is occurring for two data register sets (operation 404). If a transition from a split mode to a mirrored mode is not occurring for two data register sets, process 400 continues to wait for a transition from a split mode to a mirrored mode.

Once a transition from a split mode to a mirrored mode is occurring, process 400 calls for moving data for the threads from a data register set to second-level registers (operation 408). Moving the data may, for example, entail draining the architected memory caches, by using dummy completion operations.

Process 400 also calls for moving thread data from the second-level registers to data register sets based on use (operation 412).

Figure 5:
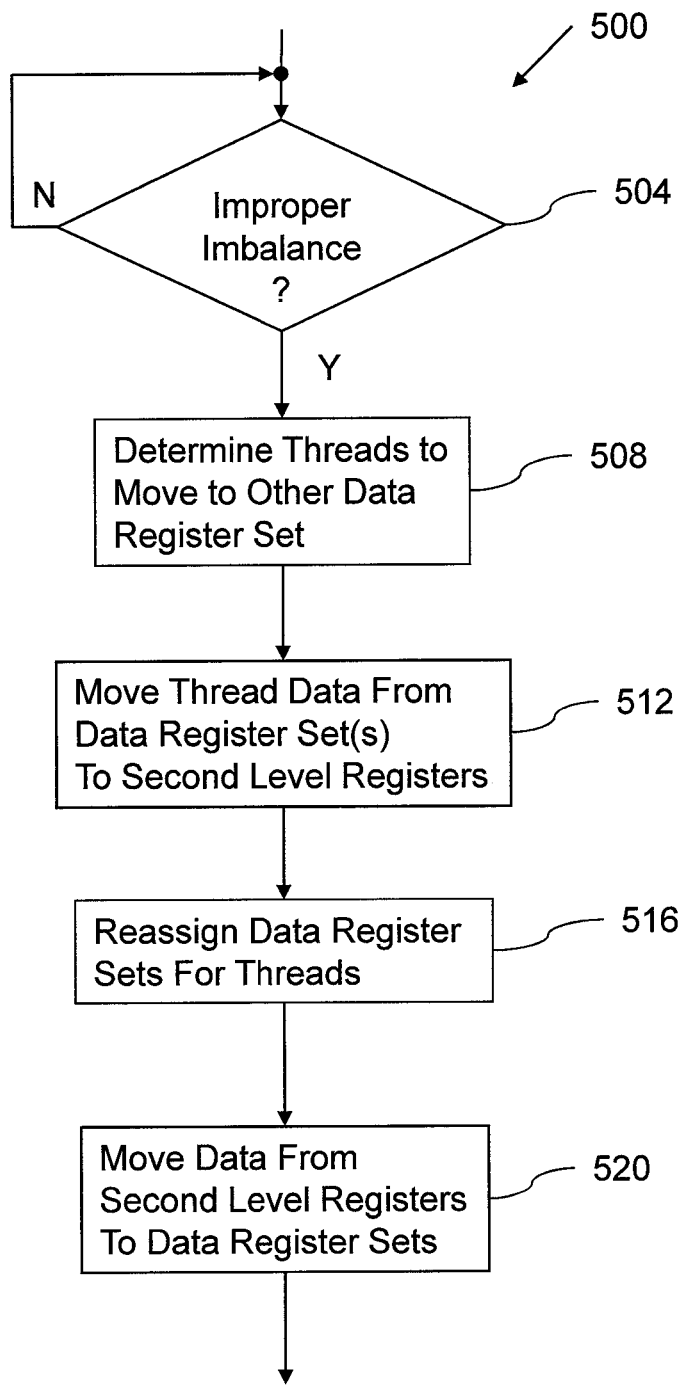
FIG. 5 is a flowchart illustrating a further example process for managing thread transitions.

FIG. 5 illustrates another example process 500 for managing thread transitions. Process 500 may, for example, be implemented by a processor such as processor 110.

Process 500 calls for determining whether an improper imbalance exists between threads assigned to data register sets. For example, if one data register set has four assigned threads and another data register set has zero assigned threads, an improper imbalance may exist because the execution elements are not being fully utilized. Imbalances may, for instance, occur as threads stop. If an improper imbalance does not exist, process 500 calls for continuing to check for an improper imbalance.

Once an improper imbalance occurs, process 500 calls determining the threads to move to the other data register set (operation 508). For example, the threads could be evenly divided between the data register sets. Process 500 also calls for moving data for the threads to be moved from the data register set(s) to second-level registers (operation 512) and reassigning the data register sets for the threads (operation 516). For example, the threads could be even divided between the data register sets.

Process 500 additionally calls for moving data from the second-level registers to the data register sets (operation 520). The data could, for example, be moved based on use or loaded before resuming execution.

FIG. 6 illustrates an additional example process 600 for managing thread transitions. Process 600 may, for example, be implemented by a processor such as processor 110.

Process 600 calls for determining whether a transition from a mirrored mode to a split mode is occurring for two data register sets (operation 604). If a transition from a mirrored mode to a split mode is not occurring for two data register sets, process 600 continues to wait for a transition from a mirrored mode to a split mode.

Once a transition from a mirrored mode to a split is occurring, process 600 calls for determining whether new threads are being added (operation 608). If new threads are not being added, process 600 calls for determining which threads to transition to the second register set (operation 612) and moving data for the threads to be transitioned from a data register set to second-level registers (operation 616). To accomplish this, for example, threads that exist on the first data register set and that are to be transitioned to the second data register set may be drained from an architected mapper cache. Process 600 also calls for moving the data for the transitioning thread to the second data register set based on use when execution resumes (operation 620).

If new threads are being added, process 600 calls for leaving data for existing threads on one data register set (operation 624) and adding the new threads to the second data register set (operation 628). If an improper balance occurs after this, the data register sets may be rebalanced (e.g., by a process similar to process 500).

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

FIG. 7 illustrates an example computer system 700 in which thread transition management may be executed. System 700 includes a central processing unit 710, an input/output system 720, and memory 730, which are coupled together by a network 740.

Central processing unit 710 may, for example, be a microprocessor, a microcontroller, or an application specific integrated circuit and include a processor and memory (e.g., registers and/or caches). Moreover, the central processing unit processor may operate by reduced instruction set computer (RISC) or complex instruction set computer (CISC) principles. In general, central processing unit may be any device that manipulates data in a logical manner.

Input/output system 720 may, for example, include one or more communication interfaces and/or one or more user interfaces. A communication interface may, for instance, be a network interface card (whether wireless or wireless) or a modem. A user interface could, for instance, be a user input device (e.g., a keyboard, a keypad, a touchpad, a stylus, or a microphone) or a user output device (e.g., a monitor, a display, or a speaker). In general, system 720 may be any combination of devices by which a computer system can receive and output data.

Memory 730 may, for example, include random access memory (RAM), read-only memory (ROM), and/or disc memory. Various items may be stored in different portions of the memory at various times. Memory 730, in general, may be any combination of devices for storing data.

Memory 730 includes instructions 732 and data 736. Instructions 732 include an operating system 733 (e.g., Windows, Linux, or Unix) and applications 734 (e.g., word processing, spreadsheet, drawing, scientific, etc.). Data 736 includes the data required for and/or produced by applications 734.

Network 740 is responsible for communicating data between processor 710, input/output system 720, and memory 730. Network 740 may, for example, include a number of different types of busses (e.g., serial and parallel).

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for thread transition management, and several others have been mentioned or suggested. Moreover, those skilled in the art will readily recognize that a variety of additions, deletions, modifications, and substitutions may be made to these implementations while still achieving thread transition management. Thus, the scope of the protected subject matter should be judged based on the following claims, which may capture one or more concepts of one or more implementations.

The invention claimed is:

1. A method comprising:
providing two data register sets coupled to a processor;
using, by the processor, the two register sets as first-level registers for thread execution;
assigning a portion of main memory or cache memory as second-level registers, the second-level registers serving as registers of at least one of the two data register sets for executing the one or more threads;
determining whether an imbalance of threads exist between the register sets of the first-level registers; and
responsive to determining that an imbalance of threads exist between the register sets of the first-level registers:
moving data for at least one of the threads into the second-level registers; and
reassigning the at least one thread among the register sets of the first-level registers.

2. The method of claim 1, further comprising moving the data for the at least one thread from the second-level registers to a select register set of the first-level registers.

3. The method of claim 1, further comprising reassigning the threads between the register sets of the first-level registers to evenly divide the threads between the register sets of the first-level registers.

4. The method of claim 1, further comprising determining which of the threads to move to a different one of the register sets of the first-level registers.

5. The method of claim 1, further comprising comparing a number of threads executing in a first one of the register sets with a number of threads executing in a second one of the register sets.

* * * * *